United States Patent [19]
Serkowski

[11] Patent Number: 5,914,939
[45] Date of Patent: Jun. 22, 1999

[54] AUTOMATIC LEARNING OF NETWORK ROUTING BY EXCHANGING ROUTE INFORMATION

[75] Inventor: Robert J. Serkowski, Broomfield, Colo.

[73] Assignee: Lucent Technologies Inc., Murray Hill, N.J.

[21] Appl. No.: 08/771,562

[22] Filed: Dec. 20, 1996

[51] Int. Cl.[6] .................................................. H04Q 11/04
[52] U.S. Cl. ........................................ 370/254; 370/400
[58] Field of Search .................................. 370/254, 255, 370/400, 401, 218, 351

[56] References Cited

U.S. PATENT DOCUMENTS

4,466,060  8/1984  Riddle ...................................... 370/218
5,088,032  2/1992  Bosack .................................... 370/401

*Primary Examiner*—Chi H. Pham
*Assistant Examiner*—Maikhanh Tran
*Attorney, Agent, or Firm*—John C. Moran

[57] ABSTRACT

Transmitting changes to its routing information by a switch node to other switch nodes that are directly connected to the switch node. No information is transmitted if there has been no change in the routing information. In addition, the switch nodes each transmit their routing information at different times as determined by the identification number of the switch node. The exchange of routing information is controlled by a low level software layer.

4 Claims, 8 Drawing Sheets

LEVEL 5 ROUTING TABLE 402 – NODE 103

| TEL# | NODE |
|---|---|
| 8XX | 108 |
| 7XX | 107 |
| 6XX | 106 |
| 4XX | 104 |
| 2XX | 102 |
| 1XX | 101 |
| 301 | 103 |
| 302 | 103 |
| 303 | 103 |
| 304 | 103 |
| 305 | 103 |

LEVEL 4 ROUTING TABLE 403 – NODE 103

| NODE# | LDC OF | # OF HOPS |
|---|---|---|
| 108 | 117 | 1 |
| 104 | 113 | 1 |
| 102 | 112 | 1 |

FIG. 5

LEVEL 5 ROUTING TABLE 502 – NODE 102

| TEL# | NODE |
|---|---|
| 8XX | 108 |
| 7XX | 107 |
| 6XX | 106 |
| 4XX | 104 |
| 3XX | 103 |
| 1XX | 101 |
| 401 | 104 |
| 402 | 103 |
| 403 | 104 |
| 404 | 104 |
| 405 | 104 |

LEVEL 4 ROUTING TABLE 503 – NODE 102

| NODE# | LDC OF | # OF HOPS |
|---|---|---|
| 106 | 119 | 1 |
| 103 | 112 | 1 |
| 101 | 111 | 1 |

FIG. 6

LEVEL 5 ROUTING TABLE 602 − NODE 106

| TEL# | NODE |
|---|---|
| 8XX | 108 |
| 7XX | 107 |
| 4XX | 104 |
| 3XX | 103 |
| 2XX | 102 |
| 1XX | 101 |
| 601 | 106 |
| 602 | 106 |
| 603 | 106 |
| 604 | 106 |
| 605 | 106 |

LEVEL 4 ROUTING TABLE 603 − NODE 106

| NODE# | LDC OF | # OF HOPS |
|---|---|---|
| 108 | 118 | 1 |
| 102 | 119 | 1 |
| 101 | 120 | 1 |

FIG. 7

LEVEL 5 ROUTING TABLE 302 − NODE 101

| TEL# | NODE |
|---|---|
| 8XX | 108 |
| 7XX | 107 |
| 6XX | 106 |
| 4XX | 104 |
| 3XX | 103 |
| 2XX | 102 |
| 101 | 101 |
| 102 | 101 |
| 103 | 101 |
| 104 | 101 |
| 105 | 101 |

LEVEL 4 ROUTING TABLE 303 − NODE 101

| NODE# | LDC OF | # OF HOPS |
|---|---|---|
| 108 | 120 | 2 |
| 106 | 120 | 1 |
| 106 | 111 | 2 |
| 103 | 111 | 2 |
| 102 | 120 | 2 |
| 102 | 111 | 1 |

LEVEL 5 ROUTING TABLE 502 – NODE 102

| TEL# | NODE |
|---|---|
| 8XX | 108 |
| 7XX | 107 |
| 6XX | 106 |
| 4XX | 104 |
| 3XX | 103 |
| 1XX | 101 |
| 401 | 104 |
| 402 | 103 |
| 403 | 104 |
| 404 | 104 |
| 405 | 104 |

LEVEL 4 ROUTING TABLE 503 – NODE 102

| NODE# | LDC OF | # OF HOPS |
|---|---|---|
| 108 | 112 | 2 |
| 108 | 119 | 2 |
| 106 | 119 | 1 |
| 106 | 111 | 2 |
| 104 | 112 | 2 |
| 103 | 112 | 1 |
| 103 | 119 | 3 |
| 101 | 111 | 1 |
| 101 | 119 | 2 |

LEVEL 5 ROUTING TABLE 302 – NODE 101

| TEL# | NODE |
|---|---|
| 8XX | 108 |
| 7XX | 107 |
| 6XX | 106 |
| 4XX | 104 |
| 3XX | 103 |
| 2XX | 102 |
| 101 | 101 |
| 102 | 101 |
| 103 | 101 |
| 104 | 101 |
| 105 | 101 |

LEVEL 4 ROUTING TABLE 303 – NODE 101

| NODE# | LDC OF | # OF HOPS |
|---|---|---|
| 108 | 120 | 2 |
| 108 | 111 | 3 |
| 106 | 120 | 1 |
| 106 | 111 | 2 |
| 104 | 111 | 3 |
| 103 | 111 | 2 |
| 102 | 120 | 2 |
| 102 | 111 | 1 |

LEVEL 5 ROUTING
TABLE 1102 – NODE 110

| TEL# | NODE |
|---|---|
| 8XX | 108 |
| 7XX | 107 |
| 6XX | 106 |
| 4XX | 104 |
| 3XX | 103 |
| 2XX | 102 |
| 1XX | 101 |
| 1001 | 101 |
| 1002 | 101 |
| 1003 | 101 |
| 1004 | 101 |
| 1005 | 101 |

LEVEL 4 ROUTING
TABLE 1103 – NODE 110

| NODE# | LDC OF | # OF HOPS |
|---|---|---|
| 108 | 144 | 1 |
| 104 | 143 | 1 |
| 103 | 142 | 1 |
| 101 | 141 | 1 |

FIG. 12

LEVEL 5 ROUTING
TABLE 302 – NODE 101

| TEL# | NODE |
|---|---|
| 10XX | 110 |
| 8XX | 108 |
| 7XX | 107 |
| 6XX | 106 |
| 4XX | 104 |
| 3XX | 103 |
| 2XX | 102 |
| 101 | 101 |
| 102 | 101 |
| 103 | 101 |
| 104 | 101 |
| 105 | 101 |

LEVEL 4 ROUTING
TABLE 303 – NODE 101

| NODE# | LDC OF | # OF HOPS |
|---|---|---|
| 108 | 120 | 2 |
| 108 | 111 | 3 |
| 108 | 141 | 2 |
| 106 | 120 | 1 |
| 106 | 111 | 2 |
| 104 | 141 | 2 |
| 104 | 111 | 3 |
| 103 | 111 | 2 |
| 103 | 142 | 2 |
| 102 | 120 | 2 |
| 102 | 111 | 1 |

Annotations: 701, 901, 1201, 702, 1202, 901, 703, 1203, 704

AUTOMATIC LEARNING OF NETWORK ROUTING BY EXCHANGING ROUTE INFORMATION

TECHNICAL FIELD

This invention relates to a switching system having a plurality of distributed switching nodes, and, in particular, to the automatic learning of new routes through the switching system by the switching nodes.

BACKGROUND OF THE INVENTION

In prior art packet switching systems, it is known for each computer system to transmit all of its routing tables to each of the other computer systems once a day. This transmission of routing information occurs at the same time by all of the computer systems, and in general, uses most of the available communication bandwidth during the period of time that the routing information is being exchanged. Normally, the exchange of routing information is done at an off peak time for the packet switching system. This method suffers from the problems of utilizing a large communication bandwidth and transmitting to distant computer systems information that is of little or no value. An additional problem is that each computer system has a large amount of routing data to analyze to determine which of the routing data applies to an individual computer system.

In other prior art packet switching systems, it is known to allow switching nodes to determine their own path through the packet switching system. U.S. Pat. No. 4,081,612 discloses a system where each switching node transmits multiple packets in order to find a route to a destination switching node. This is commonly referred to as broadcast routing. With respect to the broadcast methods used by the packet switching system or any other type of technique which relies solely on the address for finding the destination, these types of methods absorb a large amount of communication bandwidth within the packet switching system as well as place a real time load on each packet switching node.

U.S. Pat. No. 5,377,262 discloses a method of doing routing in distributed switching nodes utilizing the fact that the switching nodes are arranged in a first and second hierarchy. In addition, each switching node maintains routing information based on telephone and switching node numbers. A destination switching node transfers its routing information back to an originating switching node which combines that routing information with its own in order to determine shorter call paths for subsequent call routing. The first hierarchy is a dialing plan hierarchy having groups of switching nodes at each dialing plan level. The second hierarchy is a switching node hierarchy based on switching node numbers of each switching node with at least one switching node of the switching node hierarchy being at a different level in the dialing plan hierarchy. In order to route a call, a switching node first routes through levels of switching nodes in the dialing plan hierarchy until a second switching node is encountered which can determine the identification of the destination switching node based on a dialed telephone number. The second switching node then routes the call through the node hierarchy using the identified node number until a path is determined to the destination switching node. The techniques used in this U.S. Patent suffer from the problem that they are not quick to determine how to utilize new switch nodes that have just been installed in a distributed switch node system and to determine new routes around a failed switch node.

SUMMARY OF THE INVENTION

The foregoing problems are solved, and a technical advance is achieved by an apparatus and method in which a switch node transmits changes to its routing information to other switch nodes that are directly connected to the switch node. Advantageously, no information is transmitted if there has been no change in the routing information. In addition, the switch nodes each transmit their routing information at different times as determined by the identification number of the switch node. Advantageously, the exchange of routing information is controlled by a low level software layer.

Other and further aspects of the present invention will become apparent during the course of the following description and by reference to the accompanying drawing.

DETAILED DESCRIPTION

Figure 1:
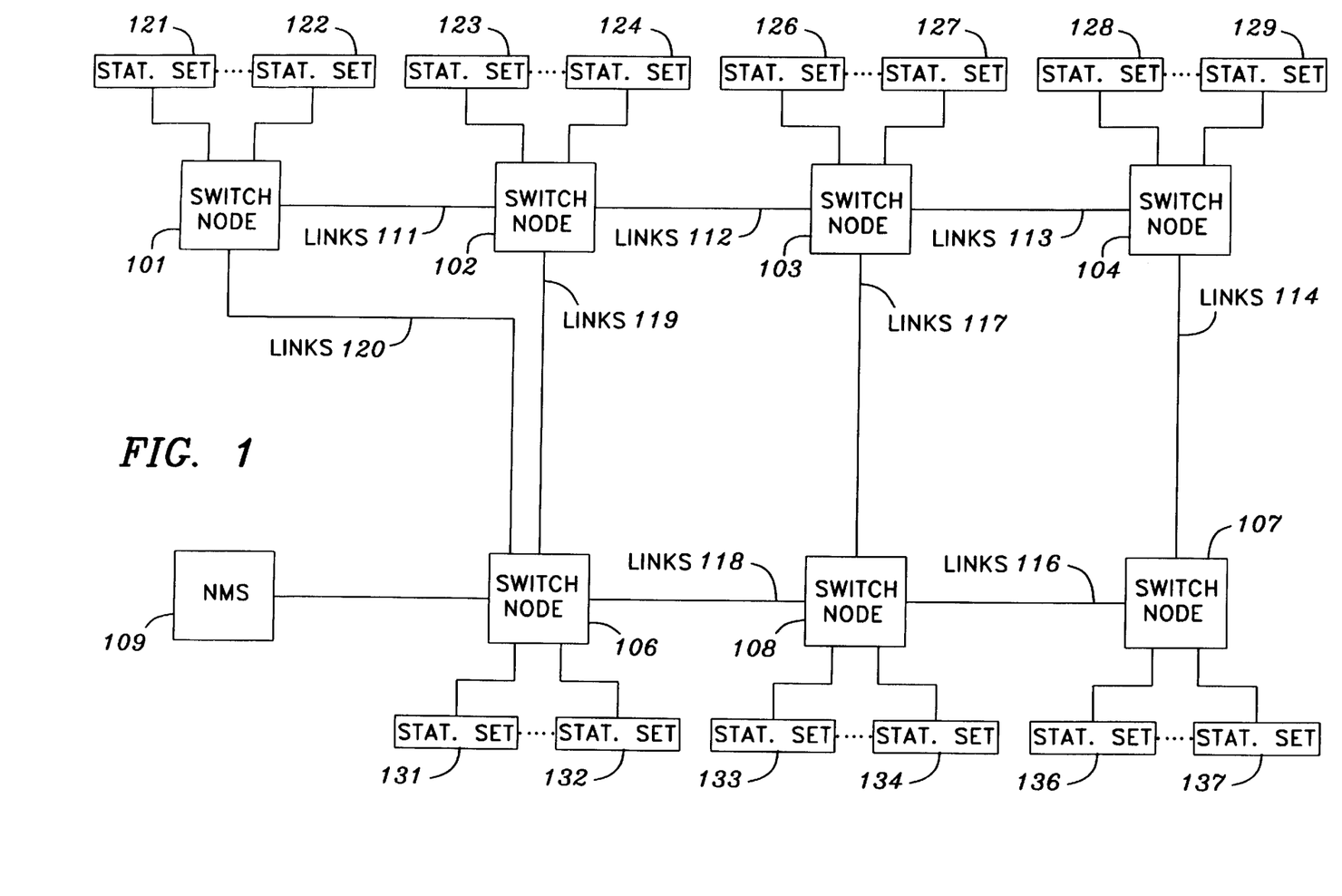
FIG. 1 illustrates a telecommunication switching system embodying the inventive concept.

FIG. 1 illustrates a telecommunication system having a plurality of distributed switch nodes. Each switch node is providing service for a plurality of telecommunication station sets such as station sets 121–122. The switch nodes are interconnected by communication links such as primary rate interface (PRI) or basic rate interface (BRI) links. Each set of links such as links 111 may consist of a plurality of PRI or BRI links.

Unlike the distributed switch node systems of the previously referenced U.S. patent, the telecommunication system illustrated in FIG. 1 does not have a dialing plan hierarchy of switch nodes nor a switch node hierarchy. When each switch node initializes, it obtains the telephone numbers of the station sets assigned to the initializing switch node by placing a call to network manager service (NMS) 109. In addition, to getting the actual telephone numbers of the station sets assigned to a switch node, each switch node receives the identification of the blocks of telephone numbers assigned to each of the other switch nodes in the telecommunication system illustrated in FIG. 1. The manner in which a switch node initializes the links interconnecting it to other switch nodes and switches calls through the switch node architecture is similar to U.S. Pat. No. 5,377,262 which is hereby incorporated by reference. Each switch node also receives from NMS 109, for each assigned station set, the handset service record (HSR) and the feature service record (FSR) associated with each station set. The handset service record defines the type of station set and its configuration. The feature service record defines what features can be utilized by the station set, the associated buttons on the station set to invoke particular features, and features that are active.

Figure 3:
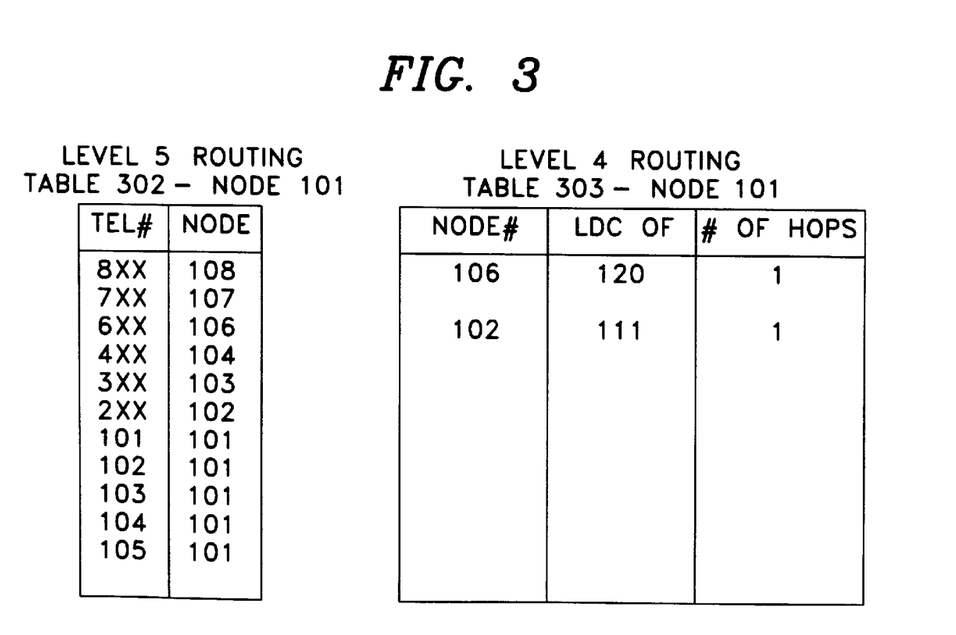
FIGS. 3–9 illustrate routing tables utilized by the telecommunication switching system.

FIG. 3 illustrates the telephone numbers and related node information obtained from NMS 109 in table 302. For simplicity, each node is assumed to control a hundred telephone numbers with the hundredth digit reflecting the last digit of the node number. For example, node 108 controls telephone numbers 8XX indicating all 800 telephone numbers. For simplicity, it is assumed that each node has only five actual telephone numbers assigned to it however. For example, node 101 has telephone numbers 101–105 assigned to it as illustrated in table 302. Table 303 of FIG. 3 indicates how node 101 routes calls to other switch nodes. As will be explained later, the LDC refers to the links leaving switch node 101.

Figure 4:
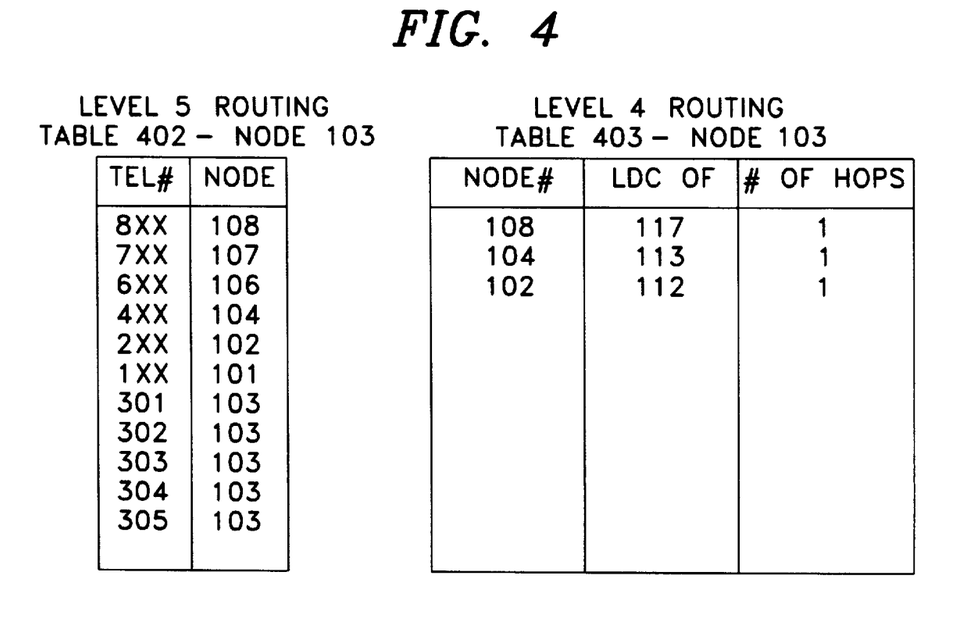
Figure 5:
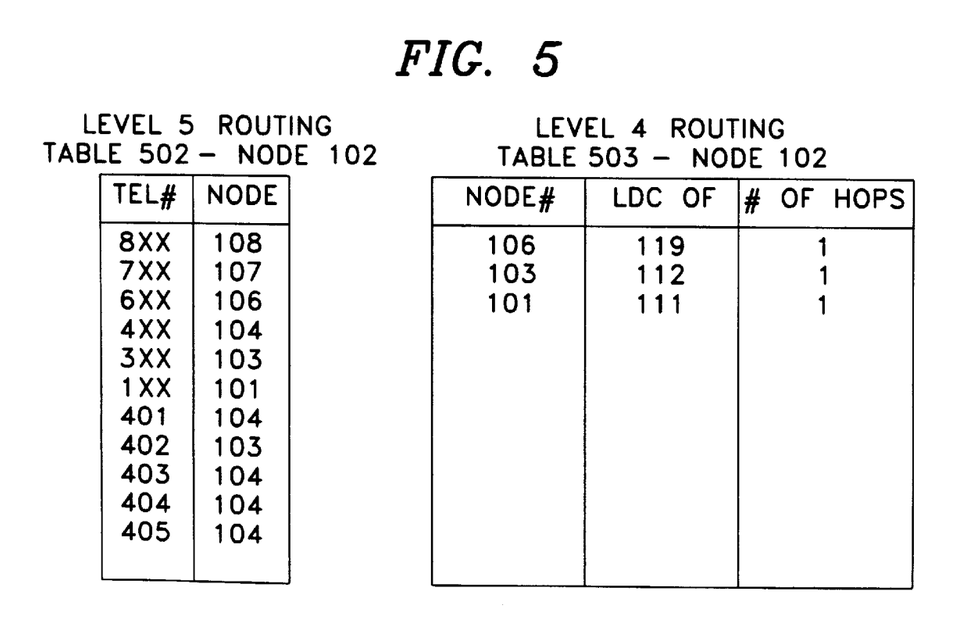
Figure 6:
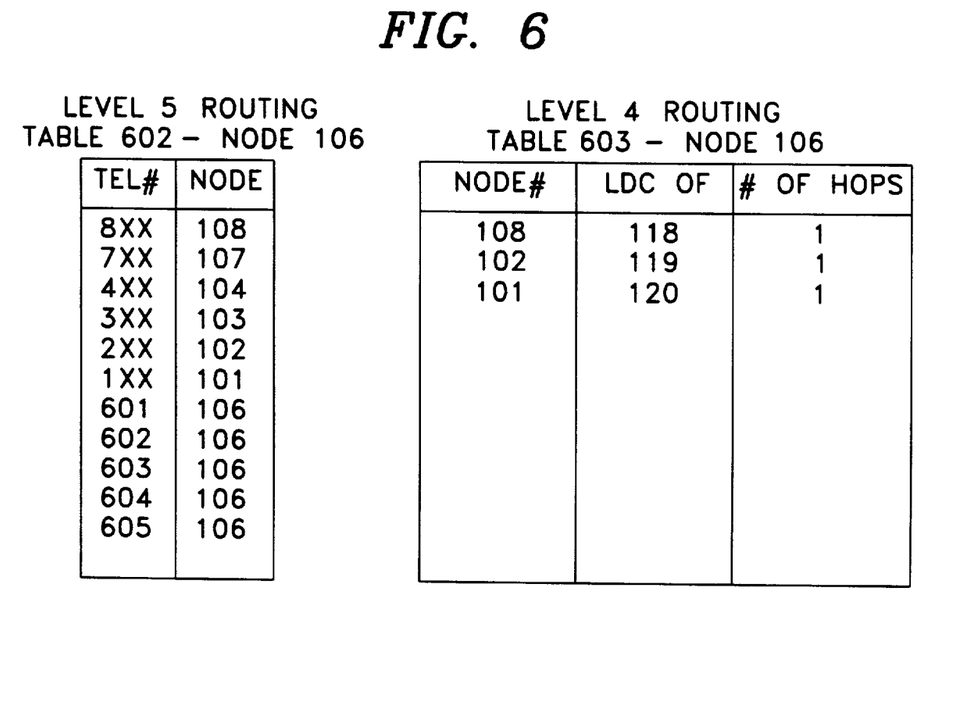
Figure 7:
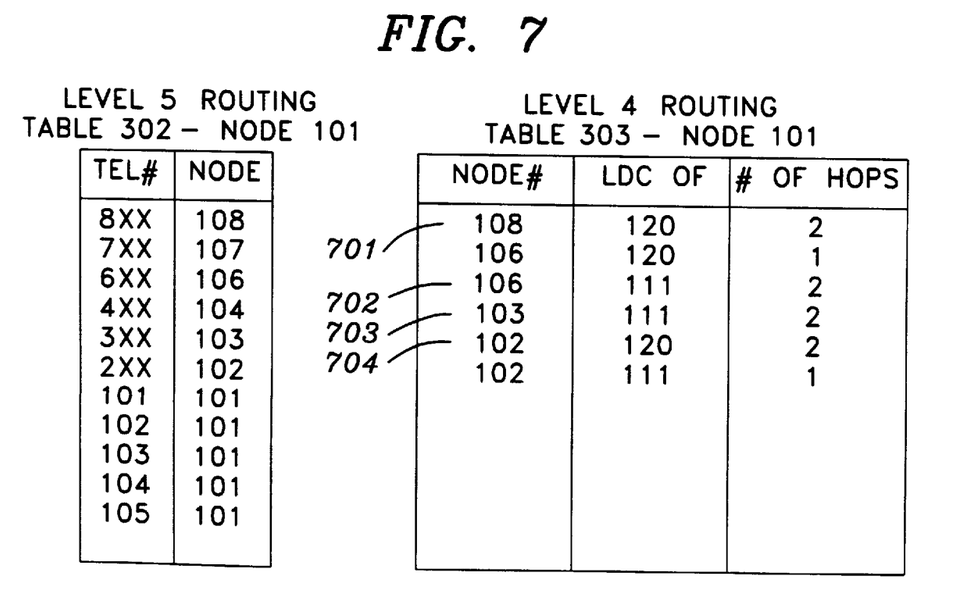

Table 303 of FIG. 3 illustrates the routes that switch node 101 has learned about in order to route calls to other switch nodes. As can be seen by comparing table 303 with FIG. 1, switch node 101 has additional indirect routes to other switch nodes. In accordance with the present invention, switch node 101 learns of these routes in the following manner. Level 4 routing table 403 of FIG. 4, table 503 of FIG. 5, and table 603 of FIG. 6 illustrate the initial routing information that is available to switch nodes 103, 102, and 106, respectively. Advantageously, every hour, each switch node transmits its routing information from its level 4 routing table to each of the other directly connected switch nodes. One skilled in the art could readily envision that this time period could be shorter. For example, the time period could be five minutes. The transmission time for an individual switch node is the hour offset by the switch node number. For example, switch node 101 transmits its routing information to switch nodes 102 and 106 one minute after the hour. One hour and six minutes after the tables illustrated in FIGS. 4–6 are present in their respective switch nodes, level 4 routing table 303 of FIG. 7 and switch node 101 appears as illustrated in FIG. 7 since switch node 101 has received routing information from switch nodes 102 and 106. Lines 701 and 704 illustrate routing information that was received from switch node 106, and lines 702 and 703 represents information that was received from switch node 102.

Figure 8:
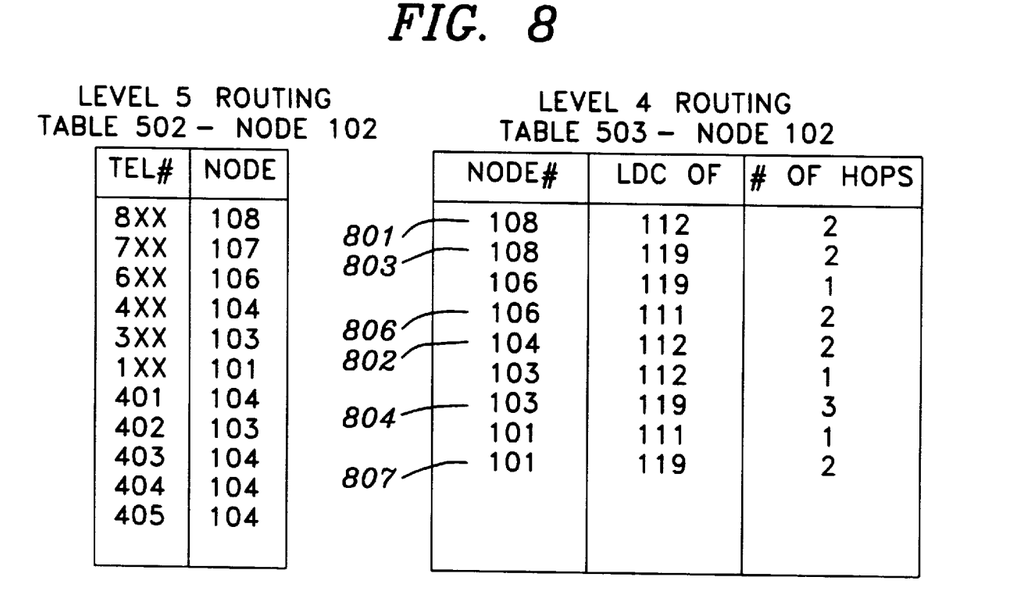
Figure 9:
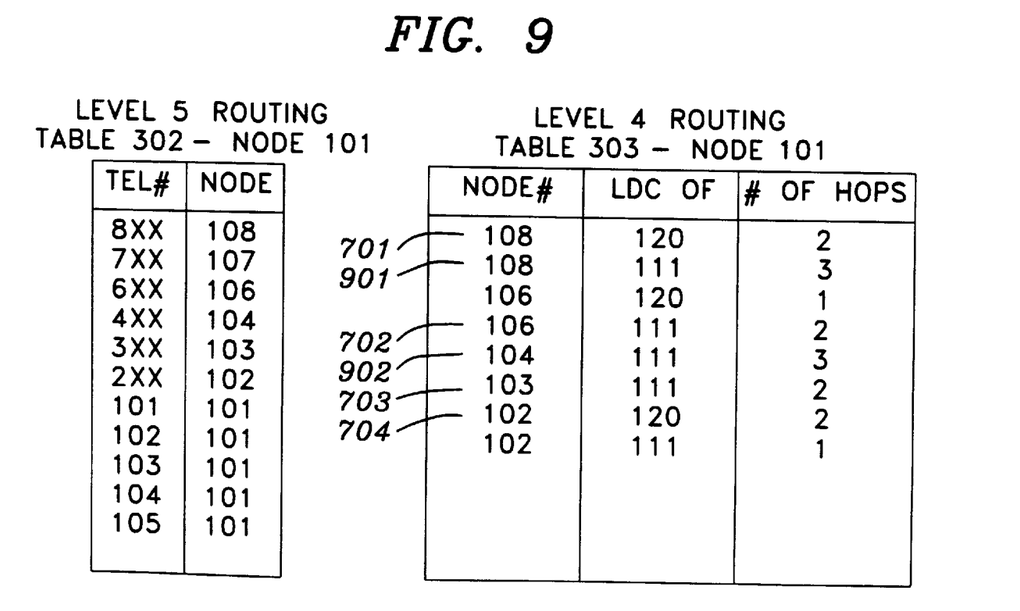
Figure 10:
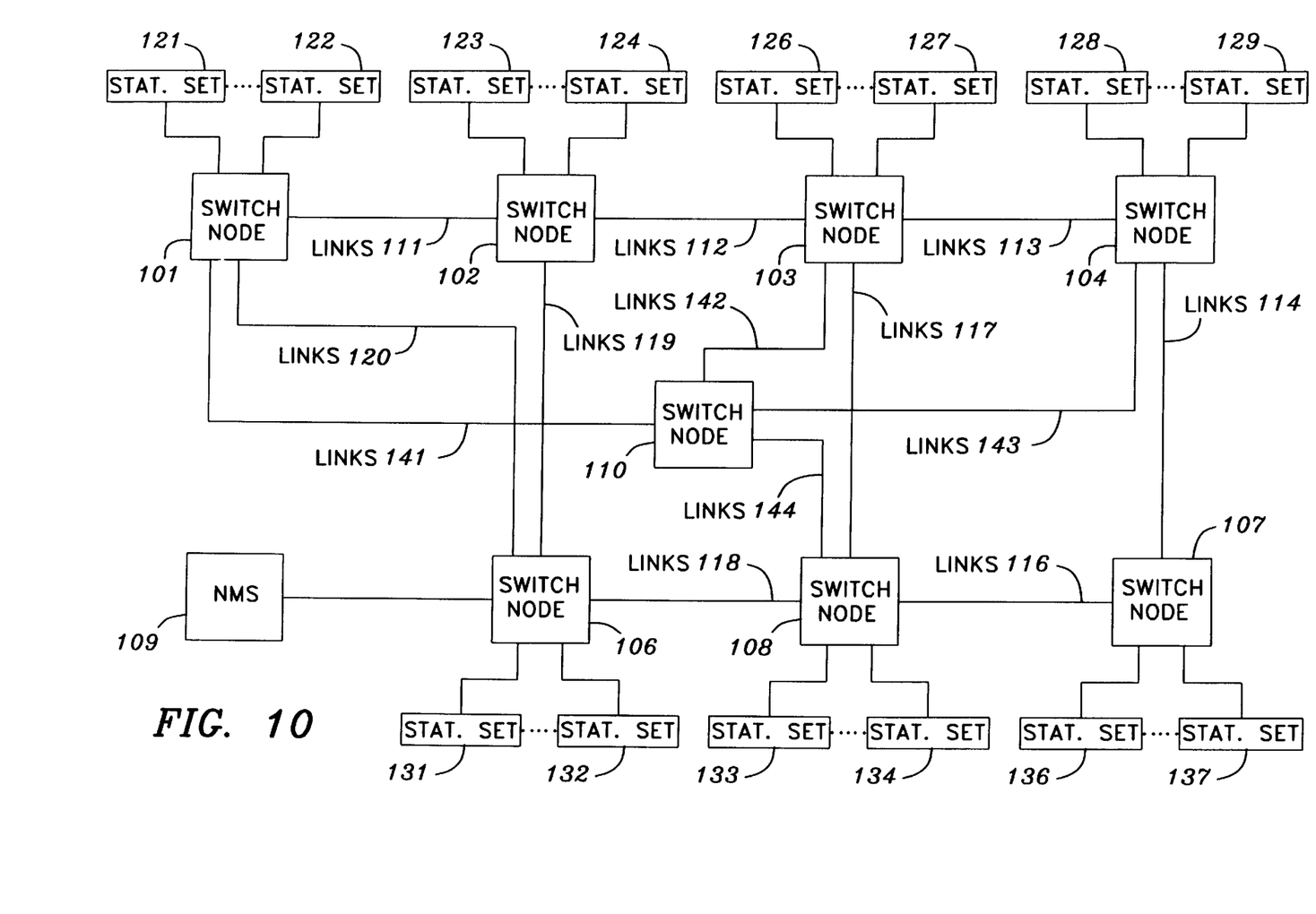
FIG. 10 illustrates the wireless telecommunication switching system with the addition of a new switch node.

In addition to the routing table 303 of switch node 101 being updated, level 4 routing table 503 of switch node 102 is updated with routes from switch nodes 101, 103, and 106. After this updating, table 503 of switch node 102 is as illustrated in FIG. 8. Of interest in table 503 is lines 801 and 802. This information was received by switch node 102 from switch node 103, and switch node 101 is not aware of this information. After the second hour, when switch node 102 transmits the changes in its routing table to switch node 101, it transmits lines 801–807. In response to these routes, switch node 101 determines that the only routes it is not aware of are the routes in lines 901 and 902 of FIG. 9. Switch node 101 ignores the routes from switch node 102 of which it was already aware. Whereas in the present example, the changes involve the addition of new routes; if routes had been removed, this information would also be transmitted and used. Note, that FIG. 9 does not reflect the additional information that would have been received from switch node 106.

Figure 11:
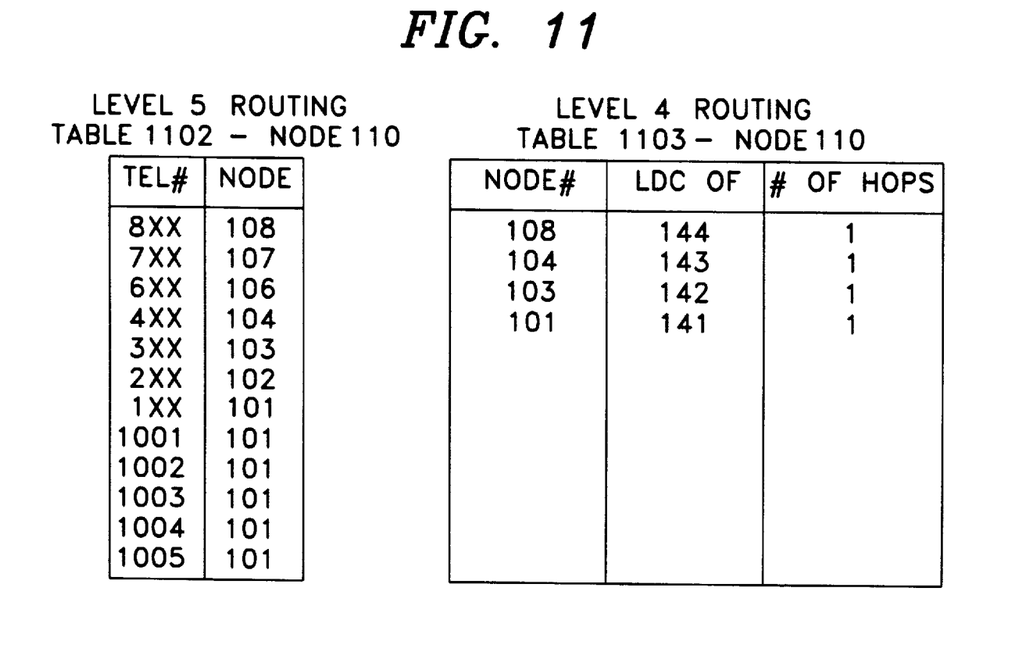
FIGS. 11–12 illustrate additional routing tables utilized by the telecommunication switching system.
Figure 12:
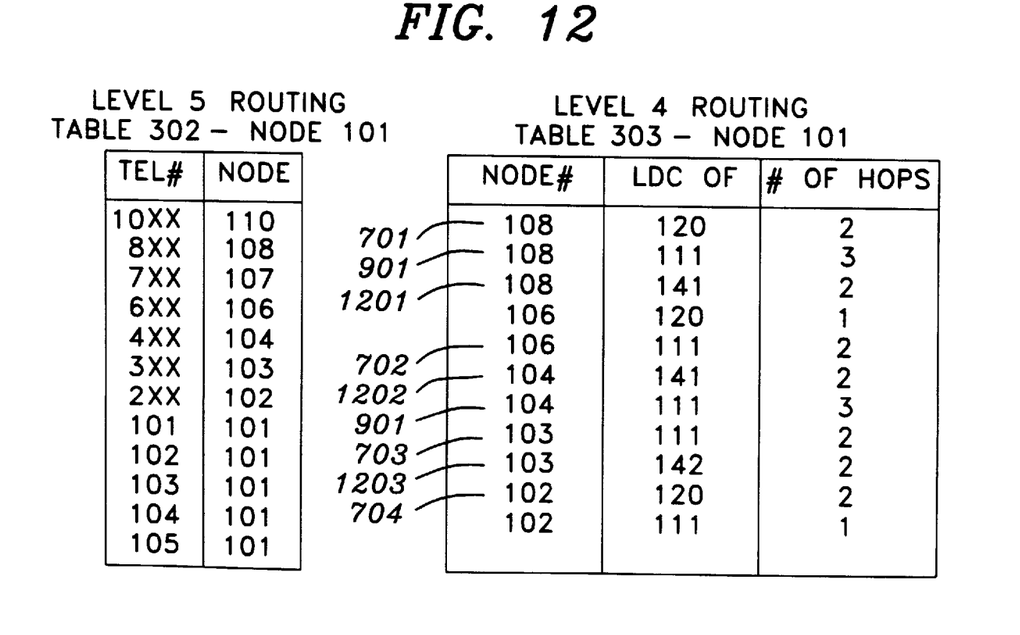

FIG. 8 illustrates the switching system of FIG. 1 with the additional of a new switch node, switch node 110. When switch node 110 is installed in the system, NMS 109 informs switch nodes 101–108 of the numbers controlled by this switch node. As was described in the previously incorporated U.S. Patent, switch nodes 101–108 become aware of the links by which they are interconnected to switch node 110 when switch node 110 initializes. FIG. 11 illustrates level 5 routing table 1102 and level 4 routing table 1103 for switch node 110. Ten minutes after the hour in accordance with the invention, switch node 110 transmits to switch node 101 the contents of level 4 routing table 1103 of FIG. 11. Switch node 101 is responsive to this information to insert into level 4 routing table 303 lines 1201–1202 of FIG. 12.

Clearly, the invention allows switch nodes 101–108 to quickly take advantage of the additional routes within the system offered by the new switch node 110. Similarly, the addition of a link, for example from switch node 102 to switch node 107, would become available to switch node 101 after switch node 101 received the new routing information from switch node 102. Since switch node 110 is new, switch nodes 101, 103, 104, and 108 would initially transmit all of their routes to switch node 110.

Figure 2:
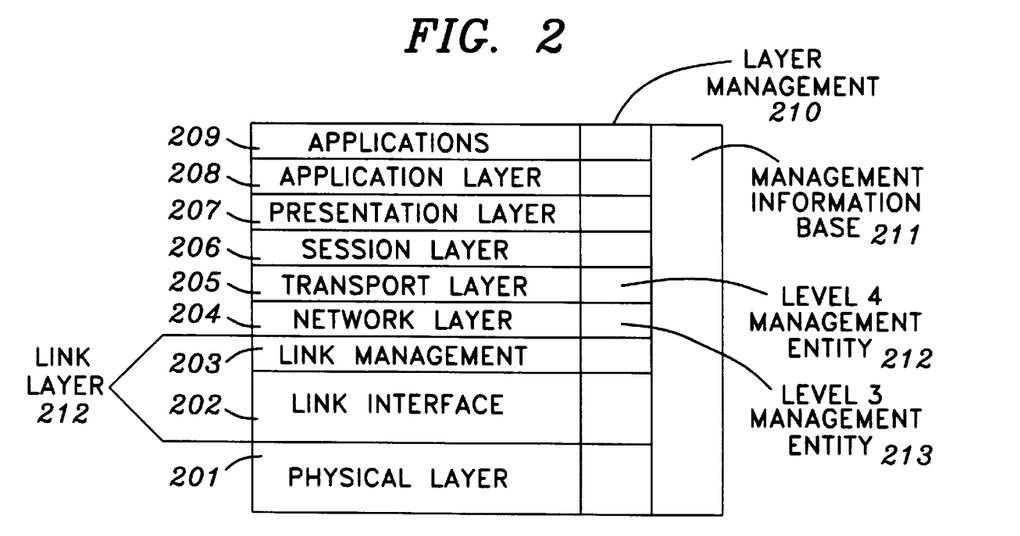
FIG. 2 illustrates the software layers of the software architecture implemented in each switch node.

FIG. 2 illustrates the software architecture of the switching nodes of FIG. 1. This architecture is based on the conventional OSI model modified to implement the ISDN protocol. In accordance with the invention as described herein, certain further modifications have been made to the standard model in order to include ISDN capabilities.

The principal function of physical layer 201 is to terminate physical links. Specifically, physical layer 201 is responsible for maintaining physical channels and for controlling physical subchannels thereon. Physical layer 201 comprises a software portion and physical interfaces. Further, the software portion of physical layer 201 is responsible for the direct control of the physical interfaces to which physical links communicating PRI and BRI information terminate. Physical layer 201 presents to link layer 212 physical subchannels and physical channels as entities controllable by link layer 212.

The primary function of link layer 212 is to assure that the information transmitted over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 212 and physical layer 201. (An example of this type of protocol is the LAPD packet protocol used in ISDN Q.921. In the ISDN standard, link layer 212 terminates the LAPD protocol.) Link layer 212 can support multiple protocols so that the upper layers are uneffected by the different protocols being utilized. Further, link layer 212 allows higher software layers to control physical layer 201 in an abstract manner.

As seen in FIG. 2, link layer 212 is divided into link interface 202 and link management 203. The reason for this division is set forth herein below. It will be helpful at this point to discuss the communication of ISDN signals over a D channel to help readers, for example, who have only a rudimentary knowledge of the communication of ISDN signals over a D channel. At link layer 212, a plurality of logical links is established on a D channel. Only one of these logical links communicates ISDN control signals, and this logical link is referred to herein as a logical D channel (LDC). The LDC is identified by a logical D channel number (LDCN).

Link interface 202 does the majority of the functions performed by link layer 212, including the establishment of the logical links. Link management 203 identifies the various link interfaces for higher software layers. Further, link management communicates information between the logical links and higher software layers.

Network layer 204 processes information communicated on the LDCs, and thereby terminates the ISDN Q.931 protocol. Hence, this layer is responsible for negotiating the utilization of system resources for the termination or origination of calls external to a switching node. The network layer controls the allocation of channels on an interface on which a call is being received or set up. For example, if switching node 101 receives a call from switching node 102 via links 111, level 3 management entity 213 of switching node 101 negotiates with its peer layer (the corresponding network layer 204 in switching node 102) in order to obtain allocation of a B channel in links 111—a procedure later to be repeated if a second B channel is desired. This negotiation is carried out using standard ISDN Q.931 messages such as the call setup and connection messages via the LDC setup on the D channel of links 111 and described in greater detail in the previously incorporated U.S. Patent. Network layer 204 identifies all B channels of given interface with the LDC for that interface. Network layer 204 is only concerned with the establishment of a call from one point to another point (e.g., switching node to switching node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switch connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node.

Network layer 204 receives information from another node concerning a call via a LDC. As information is received on the LDC, a call reference number is utilized to identify the call associated with this message. The call reference number is selected by the originating network layer during call setup in accordance with the ISDN standard. Details of this identification are given with respect to FIG. 14.

Transport layer 205, is the key element that allows the routing of a call through a complex system having multiple nodes as illustrated in FIG. 1. Its primary function is to manage the routing of calls externally, i.e., between switching nodes. Transport layer 205 views the system of FIG. 1 in terms of nodes and is concerned with routing calls from its own node to other nodes or endpoints. (As explained in the discussion of session layer 206, that layer, not transport layer 205, interprets logical destination information, such as a telephone number, to determine the destination node of a call and to establish an intra-node path by using the connection manager application.) In an overall system comprising multiple switching nodes such as switching node 101, the various transport layers communicate with each other in order to establish a call through the various switching nodes. This communication between transport layers is necessary because it may be necessary to route the call through intervening nodes to reach the destination node. Level 4 management entity 212 of each transport layer communicate among themselves utilizing signaling paths (LDCs) established between switching nodes.

With respect to inter-node routing, transport layer 205 is the first layer that starts to take a global view of the overall system illustrated in FIG. 1. Transport layer 205 uses information provided by session layer 206 to select the inter-node path. The transport layer performs its task of routing between various nodes by the utilization of tables defining the available paths and the options on those paths. These tables do not define all paths but only those paths which the node has already used.

Communication between transport layers is done by network layer 204 using established LDCs. Transport layer 205 communicates information destined for its peers to network layer 204, and network layer 204 packages this information within the information elements, IEs, of standard ISDN Q.931 messages. Network layer 204 uses the LDC that has been setup to a particular node to communicate this information to its peer network layer. Similarly, when another network layer receives information of this type, the other network layer unpackages information and then directs the information to the transport layer.

The primary function of session layer 206 is to establish communication among endpoints with all endpoints considered to be applications including, for example, a station set is considered an application. Significantly, these endpoints may be applications such as the application performing the call processing features or the dialing plan application. In any event, connections between such endpoints is considered a call. A session (call) is set up by session layer 206 any time two applications require communication with each other. As noted earlier, session layer 206 deals only in terms of switching nodes and applications on those switching nodes and relies on transport layer 205 to establish paths to other switching nodes. Session layer 206 identifies the called application by an address which previously in the telecommunication art was thought of as only a telephone number but has a much broader concept in the Q.931 protocol. From this address, session layer 206 determines the destination switching node. Session layer 206 sets up a call to the destination switching node by communicating with the session layer of the destination switching node. The communication with the other session layer is accomplished by having the session layer request its transport layer to place a call to the other switching node so that a connection can be made for a particular address. The transport layer places the call relying on the node number that was determined by the session layer. These requests are done using the network layer to generate standard ISDN Q.931 call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 207 of FIG. 2 invokes a complex protocol in order to groom the information being communicated between applications so that the applications are totally divorced from the protocol used to communicate the information. A presentation level protocol allows an application to communicate with a peer application across a transport path.

Finally, application layer 208 manages the resources needed by the applications running at software layer 209. When an application at software layer 209 is communicating with another peer application, the application is unaware of how many other applications exist or where these other applications are located. It is the function of application layer 208 to determine and use such details, consequently allowing the applications to be written in a very abstract manner.

Management information base 211 stores data used by the different software layers. Layer management 210 provides the link management entities required at each software layer such as entities 212 and 213.

Figure 13:
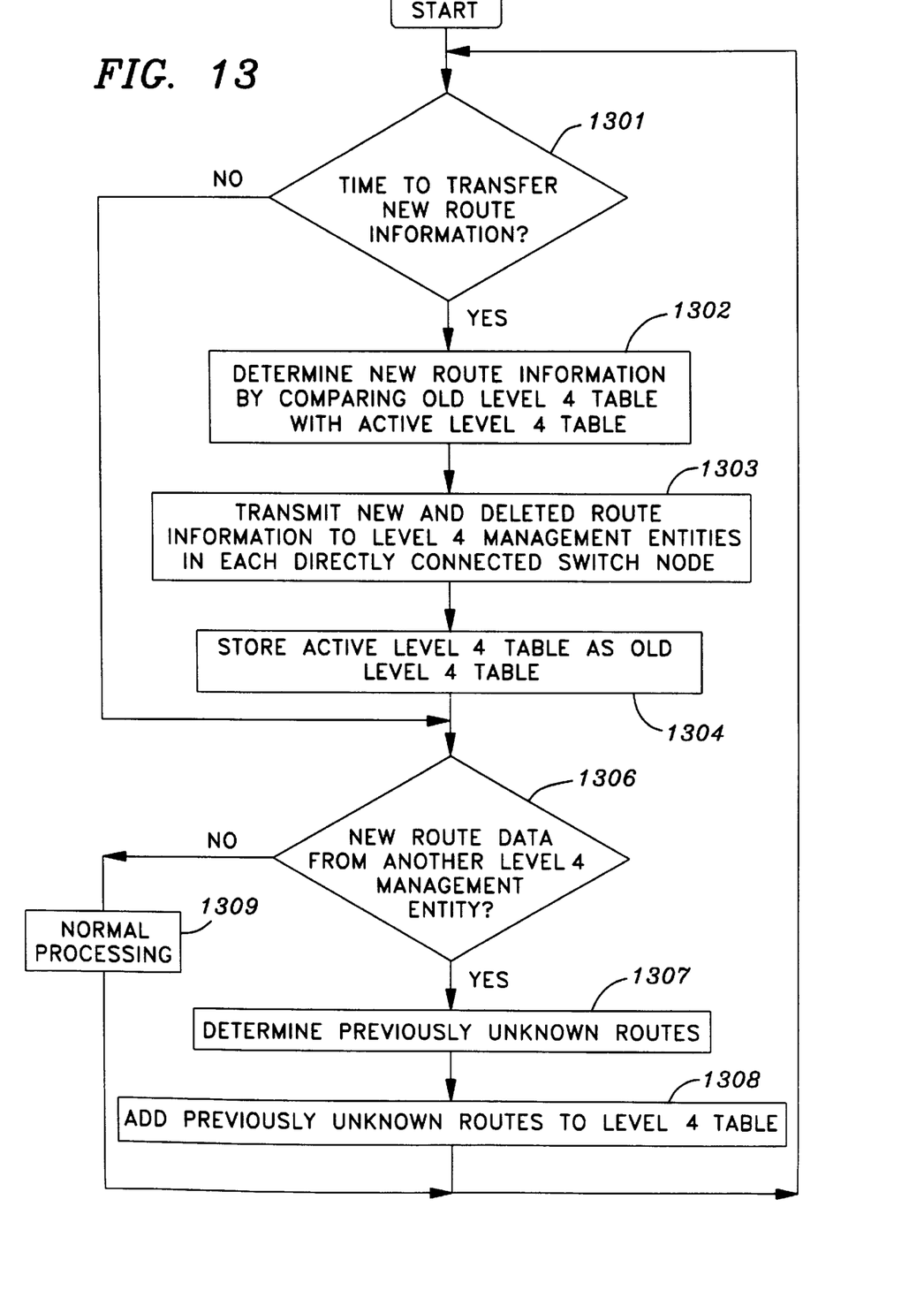
FIG. 13 illustrates steps performed by level 4 management entity in the transport software layer.

FIG. 13 illustrates the steps performed by the level 4 management entity 212 of FIG. 2 in a switch node in accordance with the invention. Decision block 1301 determines if it is time to transfer any new routes that have been determined by the switch node. If the answer is yes, 1302 examines the present active 4 table, which is for example table 303 of FIG. 3, against a previously stored level 4 table to determine the new route information. Then, block 1303 transmits the new route information to each of the level 4 management entities in each directly connected switch node. Finally, block 1304 stores the present active level 4 table as the old level 4 table before transferring control to decision block 1306.

Returning to decision block 1301, if the answer is no or control is transferred from block 1304, decision block 1306 determines if new route data is being received from another level 4 management entity. If the answer is no, block 1709 does normal processing before returning control to decision block 1301. If the answer in decision block 1306 is yes, block 1307 examines the new route data to determine previously unknown routes. Block 1308 then adds these previously unknown routes to the active level 4 table before transferring control back to decision block 1301. One skilled in the art could readily see that block 1308 could use various criterion to determine which of these previously unknown routes to add to the active level 4 table. For example, only the three best routes would be maintained in the level 4 table. In addition, the routes entered into the level 4 table utilize as the link number in the active level 4 table the link number of the link of the directly connected switch node from which the data was received.

It is to be understood that the above-described embodiments are merely illustrative of the principles of the invention and that other arrangements may be devised by those skilled in the art without departing from the spirit and scope of the invention.

The invention claimed is:

1. A method of exchanging routing information within a telecommunication switching system having a plurality of switch nodes interconnected by a plurality of groups of communication links and each of the plurality of switch nodes has an unique identification number, comprising the steps of:

transmitting every predefined period of time by each of the plurality of switch nodes routing information of each of the plurality of switch nodes to only a set of ones of the plurality of switch nodes directly connected by ones of the plurality of groups of communication links to each of the plurality of switch nodes with the predefined period of time being modified by the unique identification number of each of the plurality of switch nodes wherein the routing information defines individual groups of communication links from each of the plurality of switch nodes for communication with individual ones of the plurality of switch nodes and only routing information that had changed since the last transmission period is transmitted including both new and deleted routing information;

receiving by each of the plurality of switch nodes only routing information of each of the set of ones of the plurality of switch nodes; and updating the routing information of each of the plurality of switch nodes with the received routing information.

2. The method of claim 1 wherein each of the plurality of switch nodes executing a plurality of software layers and the steps of transmitting and receiving are performed by a lower one of the plurality of software layers in each of the plurality of switch nodes.

3. A telecommunication switching system for exchanging routing information with the telecommunication switching system having a plurality of switch nodes interconnected by a plurality of groups of communication links and each of the plurality of switch nodes has an unique identification number, comprising:

means for transmitting every predefined period of time by each of the plurality of switch nodes routing information of each of the plurality of switch nodes to only a set of ones of the plurality of switch nodes directly connected by ones of the plurality of groups of communication links to each of the plurality of switch nodes with the predefined period of time being modified by the unigue identification number of each of the plurality of switch nodes wherein the routing information defines individual groups of communication links from each of the plurality of switch nodes for communication with individual ones of the plurality of switch nodes and only routing information that had changed since the last transmission period is transmitted including both new and deleted routing information;

means for receiving by each of the plurality of switch nodes only routing information of each of the set of ones of the plurality of switch nodes; and means for updating the routing information of each of the plurality of switch nodes with the received routing information.

4. The telecommunication switching system of claim 3 wherein each of the plurality of switch nodes executing a plurality of software layers and the steps of transmitting and receiving are performed by a lower one of the plurality of software layers in each of the plurality of switch nodes.

* * * * *